United States Patent
Klaassen et al.

(10) Patent No.: US 6,622,252 B1
(45) Date of Patent: Sep. 16, 2003

(54) DATA STORAGE DEVICE HAVING SELECTABLE PERFORMANCE MODES FOR USE IN DUAL POWERED PORTABLE DEVICES

(75) Inventors: Klaas Berend Klaassen, San Jose, CA (US); Jacobus C. L. Van Peppen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,358

(22) Filed: Apr. 12, 2000

(51) Int. Cl.$^7$ .................................................. G06F 1/32
(52) U.S. Cl. ......................... 713/320; 360/69; 713/300
(58) Field of Search ........................... 713/300; 360/71, 360/73.01, 73.08; 327/170; 326/82

(56) References Cited

U.S. PATENT DOCUMENTS

| | | | |
|---|---|---|---|
| 5,230,056 A | | 7/1993 | Hoshina ..................... 395/750 |
| 5,345,347 A | * | 9/1994 | Hopkins et al. ............... 360/71 |
| 5,442,794 A | | 8/1995 | Wisor et al. ................. 395/750 |
| 5,452,277 A | | 9/1995 | Bajorek et al. ................ 369/54 |
| 5,493,670 A | * | 2/1996 | Douglis et al. ............. 713/324 |
| 5,745,774 A | | 4/1998 | Munetsugu ............ 395/750.04 |
| 5,787,292 A | | 7/1998 | Ottesen et al. ......... 395/750.01 |
| 5,805,005 A | * | 9/1998 | Raisinghani et al. ....... 327/333 |
| 5,926,049 A | * | 7/1999 | Shi ............................. 327/170 |
| 5,944,828 A | | 8/1999 | Matsuoka .................... 713/323 |
| 5,966,032 A | * | 10/1999 | Elrabaa et al. ................ 326/84 |
| 5,974,556 A | | 10/1999 | Jackson et al. .............. 713/322 |
| 6,191,643 B1 | * | 2/2001 | Nayebi et al. ............... 327/536 |
| 6,215,609 B1 | * | 4/2001 | Yamashita et al. ....... 360/73.03 |

* cited by examiner

*Primary Examiner*—Thomas Lee
*Assistant Examiner*—Mark Connolly
(74) *Attorney, Agent, or Firm*—McGinn & Gibb, PLLC; Khanh Q. Tran, Esq.

(57) ABSTRACT

A portable computer includes a battery and a connection to an external power source, a two-speed data storage device being supplied power from one or more of the battery and the external power source, and a controller attached to the storage device. With the invention, when the storage device is powered by the internal battery, the controller not only reduces the rotation speed and the clock rate of the storage device, but also reduces the power consumption of the read/write electronics module inside the disk drive by lowering the power supply voltage for the write driver inside said module and lowering the tail currents for the amplifier stages in the readback amplifier inside said module. When the storage device is powered by an external power source, the controller will run the storage device at full speed and highest clock rate, and will provide the write driver inside the read/write electronics module with a power supply voltage high enough to accommodate the resulting higher data rate, and will provide tail currents in the amplifier stages of the readback amplifier high enough to accommodate the higher required bandwidth for the readback amplifier.

21 Claims, 4 Drawing Sheets

DATA STORAGE DEVICE HAVING SELECTABLE PERFORMANCE MODES FOR USE IN DUAL POWERED PORTABLE DEVICES

BACKGROUND OF THE INVENTION

1. Field of the Invention

The present invention generally relates to portable electronic devices and more particularly to power conserving storage devices within portable computers such as magnetic hard disk drives.

2. Description of the Related Art

The use of direct access storage devices (DASD), such as magnetic disk drives, in portable computers has increased significantly over the past several years. Such computers typically have a portable battery pack that provides power to the various components of the computer when the computer is used away from a power outlet. It is important that the battery pack used to supply power to the portable computer be compact and lightweight. However, as the portable computers are increasingly used in locations where an external power source is unavailable, for example, traveling on an airplane, it is also increasingly important that the portable computers operate for significant periods of time between recharging of the battery pack.

The desire to achieve a compact and light weight design often competes with a desire for longer usage time of the computer between charging the battery pack. In order to increase operating time at the portable computer, various steps have been taken to reduce the power consumption of components used in the computer. For example, the central processing unit (CPU), often includes some form of power management function to reduce clock frequency of the CPU when the computer is in a power savings mode. In general, a power saving mode may be invoked to reduce use of power by a component of the computer when the component is not being used.

In the case of memory storage devices various power savings techniques have been employed. For example, in disk drives, the spindle motor uses a large percentage of the total power. In order to conserve power, it has been proposed that the spindle speed of the disk drive be reduced or stopped when the disk drive is not being used by the portable computer. In a typical approach, a normal operating spindle velocity is used by the disk drive during read and write operations to the disk. When the power saving mode is initiated, for example, when the disk drive is not accessed over a predetermined period of time, the spindle velocity of the disk is reduced or stopped to conserve power. When an access operation to the disk drive is initiated, the spindle speed is increased until the disk is rotated at the normal operating velocity prior to beginning the read or write operation. In other words, the power saving mode is disengaged prior to the commencement of read and write operations.

Similarly, low power hard disk drives are utilized in portable computers to extend battery life. Such low power hard disk drives commonly operate at relatively low rotational speeds (4200–4900 RPM) and reduced data transfer rates (120 Mb/s). To the contrary, a conventional desktop computer (AC powered), includes a hard disk drive which operates at higher rotation speeds (5400–7200 RPM) and increased data rates (195–225 Mb/s).

Therefore, the designers of portable computing devices must choose between performance and power consumption. If the designer chooses a fast hard disk drive for the portable computing device, the battery life will suffer if used away from an external power supply. To the contrary, if the designer chooses a slow drive to extend battery life, the performance of the device will suffer even if the computing device is connected to an external power supply. Therefore, there is a need to have a disk drive that behaves like a fast high-performance hard disk drive when the portable computer is connected to a external power supply, and behaves like a slow-speed low-performance disk drive, with reduced power consumption, when using the computer away from an external power supply, using its internal battery.

An example of a conventional power saving hard disk drive system is disclosed in U.S. Pat. No. 5,787,292, which is incorporated herein by reference. U.S. Pat. No. 5,787,292 discloses a multi-frequency zoned disk in which data is read and written from and to the disk at a reduced rotation speed in battery mode. The power savings obtained here are by the reduced power consumption of the motor running at a lower speed and by the reduced power consumption of the dominantly digital channel running at a lower data rate.

SUMMARY OF THE INVENTION

The object of the present invention is to provide a structure and method for reducing the power consumption of the hard disk drive even further than obtained with the previous art-methods as in U.S. Pat. No. 5,787,292, by also reducing the power consumption of the read/write electronics module, also referred to as the Arm Electronics (AE) module, of the hard disk drive when in battery mode.

A portable computer comprising a battery and a connection to an external power source; a two-speed data storage device being supplied power from one or more of the battery and the external power source; and a controller attached to the storage device, (wherein) the controller reduces a speed and data transfer rate of the storage device when the storage device is powered by the battery and increases the speed and data transfer rate of the storage device when the storage device is powered by the external power source.

The portable computer (wherein) the storage device includes at least one magnetic disk, (wherein) the controller reduces a rotational speed of the magnetic disk when the portable computer is powered by the battery and increases the rotational speed when the portable computer is powered by the external power supply, (wherein) the storage device includes a read/write electronics module, comprising a write driver circuit connected to a write head writing to the magnetic disk, (wherein) the write driver circuit includes a power supply having an output voltage supplied to the writehead, the output voltage being reduced when the storage device is powered by the battery and the output voltage being increased when the storage device is powered by the external power supply, (wherein) the power supply connected to the write driver circuit has multiple resistive elements, (wherein) the resistive elements determine the output voltage of the power supply, (wherein) the output voltage is reduced by disconnecting at least one of the resistive elements from the power supply and the output voltage is increased by connecting at least one of the resistive elements to the power supply, (wherein) a rise and fall time of a write current of the write head is increased by reducing the output voltage supplied to the write driver circuit and the rise and fall time of the write current is decreased by increasing the output voltage supplied to the write driver circuit, (wherein) the rise and fall time of the write current is changed inversely proportional to the rotational speed of the magnetic disk, (wherein) the storage device includes a read/write electronics module comprising a read amplifier connected to a (G)MR read head, reading magnetic transitions from the magnetic disk, (wherein) the read amplifier comprises multiple cascaded amplifier stages and, (wherein) tail currents of the amplifier stages are reduced when the storage device is powered by the battery and the tail currents of the amplifier stages are increased when the storage device is powered by the external power source, (wherein) the tail currents are changed proportional to the rotational speed of the magnetic disk.

A portable electronic device comprising a battery and a connection to an external power source; and a multi-speed data storage device being supplied power from one or more of the battery and the external power source, (wherein) a data transfer rate of the storage device is reduced when the storage device is powered by the battery and the data transfer rate of the storage device is increased when the storage device is powered by the external power source.

A method of conserving power in a portable electronic device comprising determining whether the electronic device is being supplied power from an internal battery or an external power source; reducing a data transfer rate of a storage device when the electronic device is powered by the battery; and increasing the data transfer rate of the storage device when the storage device is powered by the external power source.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

To reduce the power consumption even further than with the conventional methods discussed above, the invention utilizes a state-of-the-art multi-speed hard disk. The hard disk drive operates at a high rotational speed when the portable computer is connected to an external power source and at a lower rotational speed when the computer is operating from the internal battery power supply.

At the lower rotational speed the clock rate is reduced by the same factor as the rotational speed is lowered. This lower clock rate reduces the power consumption of the data channel chip by almost the same factor because the power consumption in the data channel chip is mainly determined by the switching of the digital logic of which the power consumption is proportional to the switching frequency, i.e. the data rate.

Therefore, when the inventive portable computer is battery operated the hard disk drive runs at a reduced speed and reduced data rate, which reduces power consumption. When the laptop is powered by an external power supply, the disk drive runs at full speed and maximum data rate. The resulting extra power consumption in full speed operation can be easily satisfied by the line-coupled external power supply. In addition, the fan can be operated to reduce the extra heat generated by the higher disk speeds when the portable computer is connected to the external power supply.

Conventional power management systems in portable electronic devices only reduce the speed of the hard drive when there is no read/write activity for a given time period (e.g., sleep mode). With conventional devices, the disk is operated at its maximum speed during read and write operations regardless of whether the portable device is connected to an external power supply or is operating off its own internal battery.

The only distinction some systems make regarding power supply source relates to when to enter the power saving mode. In other words, some conventional systems do not enter the power savings mode when the portable-computing device is connected to an external power supply.

The invention can be used with all conventional power saving systems and methods. Therefore, for example, in addition to operating at a lower speed in battery mode, the invention could also provide that the hard disk drive stops (or operate at an even further reduced speed) when there is no read/write activity. However, the invention is distinctive in that when it recovers from the sleep mode, the invention still reads and writes to the hard drive at a reduced speed (and reduced power consumption) when in battery mode as compared to the full speed operation that occurs when the portable computing device is connected to an external power supply.

Figure 1:
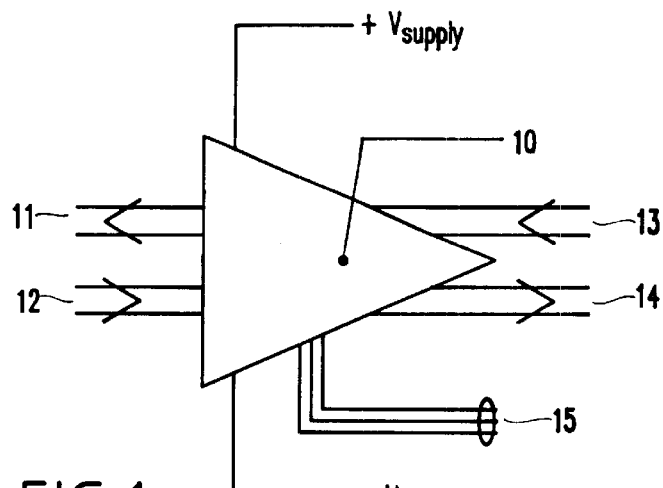
FIG. 1 is a schematic diagram of a state-of-the-art read/write electronics module.

The invention is superior to such conventional systems because it offers the user high-performance operation when connected to an external power source an extended battery life when operating from the internal battery power supply. Referring now to the drawings, and more particularly to FIG. 1, a state-of-the-art read/write electronic module 10 of a disk drive is shown. The module 10 includes a write port connected to a write head 11 and a read port connected to a read head 12. Write data 13 is input to the integrated circuit 10 and a read signal 14 is output from the integrated circuit 10. In addition, an input/output (I/O) bus 15 and power supply +V/−V is connected to the integrated circuit 10.

For the invention, the write driver electronics and the readback amplifier inside the read/write electronics module each has its own power supply line. The invention lowers the power consumption of the read/write electronics module 10 in the battery mode by lowering the power supply for the write driver. The reason that the power supply voltage can be lowered in the battery mode is as follows.

Figure 2:
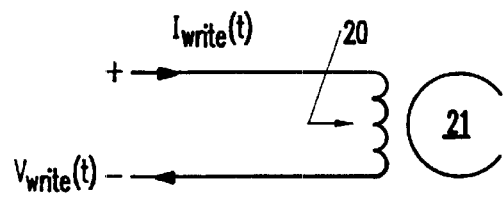
FIG. 2 is a schematic diagram of the voltage across the inductive write head as function of the write current.

In the battery mode, the rotational speed is reduced by a factor of N, which reduces the data rate by a factor N as well. This allows the rise and fall time of the write driver current to be increased by the same factor N. FIG. 2 is a schematic drawing of a write head. Item 20 is the coil of the write head and item 21 is the magnetic core of the write head. The total write driver power supply voltage to accommodate a certain write current with a certain rise time should be at least $$V_s(\text{write driver}) > IR_{head} + L_{head}\left(\frac{dI_{write}}{dt}\right)_{max} + \text{headroom for active devices}$$

where I is the required base-to-peak steady-state write current; L is the effective write inductance of the inductive write head; and Rhead is the DC coil resistance of the write head. The center term gives by far the largest contribution. Thus, the required write driver power supply voltage is almost linearly proportional to $dI_{write}/dt$, i.e. inversely proportional to the write current rise/fall time and, as a result, proportional to the data rate.

Consequently, the required power supply voltage for the write driver output stage can also be reduced by this factor N with respect to the power supply voltage required at full speed (at the same write current). Reducing the required supply voltage for the write driver output stage reduces the power consumption of the write driver output stage by the same factor N.

Figure 3:
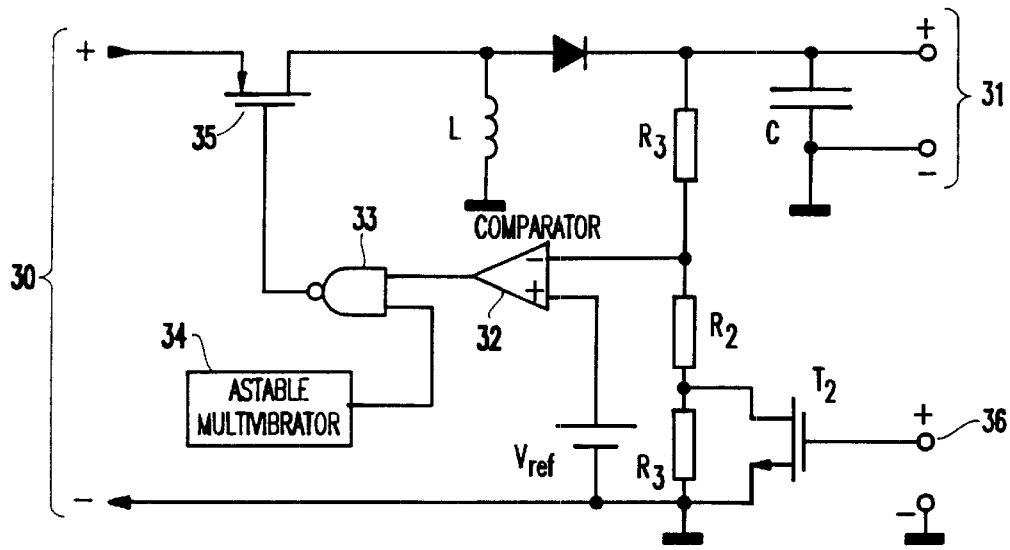
FIG. 3 is a schematic diagram of the implementation of a switching power supply with a selectable regulated output voltage.

The required supply voltage for the write driver output stage can be reduced by controlling the switching power supply's output voltage, as shown in the schematic diagram shown in FIG. 3. The power supply in FIG. 3 converts an unregulated power supply voltage $V_{in}$ 30 (10.5–13V) to a regulated power supply voltage $V_{out}$ 31 using a feedback loop which includes three resistors $R_1$, $R_2$, and $R_3$, a comparator 32 connected between resistors $R_1$ and $R_2$, and a reference voltage $V_{ref}$. A NAND logic unit 33 receives input from an stable multivibrator 34 and the comparator 32 to control a transistor 35.

The attenuator formed by the three resistors $R_1$, $R_2$, and $R_3$ and the reference voltage $V_{ref}$ determine the power supply voltage $V_{out}$ 31. More specifically, the output voltage can be selectively changed by shorting R3 using a field effect transistor (FET) switch T2 across this resistor. If the gate voltage 36 of T2 is high, the switch is closed and the (high-performance mode) output voltage of the switching power supply is given by:

$$V_{out} = V_{ref}\frac{R_1 + R_2}{R_2}$$

With the gate voltage 36 low ($\cong$0V), the (low-performance mode) output voltage is given by:

$$V_{out} = V_{ref}\frac{R_1 + R_2 + R_3}{R^2 + R_3}$$

By choosing R3=(N−1)(R1+R2), the power supply in the low power mode will be a factor N lower than in the high-performance mode.

For the read amplifier of the read/write electronics module, both power modes require the same biasing of the MR/GMR (magnetic resistive/giant magnetic resistive) read head and the same noise performance of the biasing circuitry. Therefore, the biasing circuitry for the read head should remain the same for all power modes. In the battery mode, the data rate is reduced by N (because the rotational speed of the hard disk is reduced by a factor N) and, as a result, the bandwidth of the amplifier and output stages can be cut by the same factor N. This reduction in bandwidth is achieved by reducing the tail currents of these stages by a factor of N and, as a result, reducing the power consumption of these stages by a factor of N at the same time. The switch from battery operated mode to AC powered mode is by a separate command via the I/O bus of the read/write electronics module controlling the gate of FET switches T2. This is illustrated in FIGS. 4a–4c.

Figure 4A:
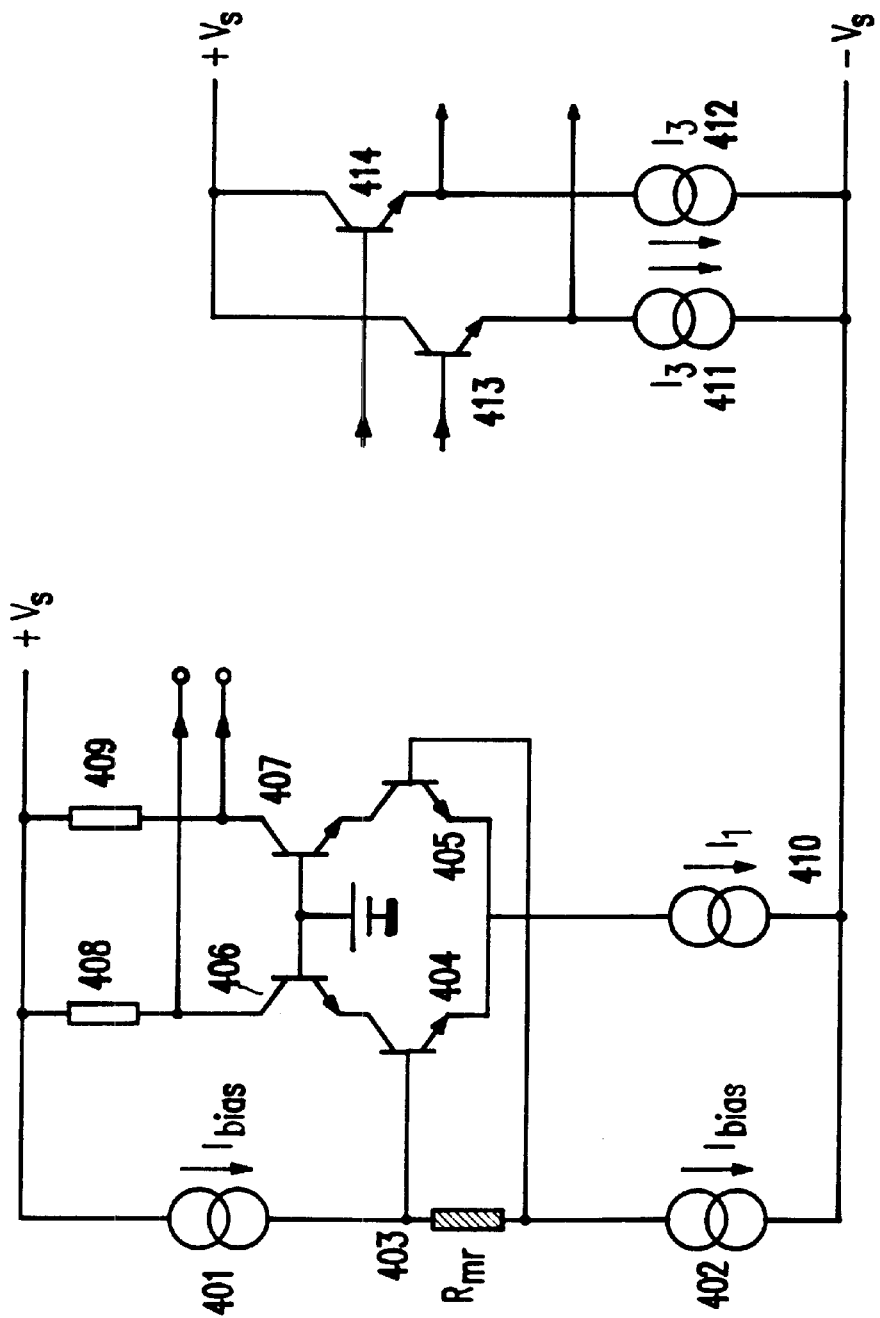
FIG. 4a is a schematic diagram of a prior art input and output stage of the readback amplifier in the read/write electronics module.
Figure 4C:
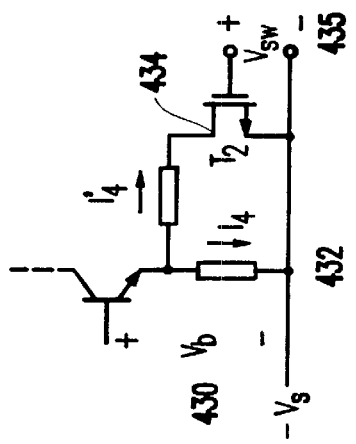
FIG. 4c is a schematic diagram of an alternative implementation of the tail current sources in FIG. 4b.

More specifically, FIG. 4a is an example of a conventional input and output stage in the readback amplifier inside a read/write electronics module. The G(MR) read element 403 is suspended between two current sources 401 and 402, each with a current magnitude Ibias, to bias the (G)MR element with the required bias current Ibias. The readback voltage generated across this readback element 403 is connected to a state-of-the-art readback amplifier input stage which comprises transistors 404 and 405 in a long-tail pair configuration with a tail current source 410 with magnitude I1. The collectors of transistors 404 and 405 are connected to the emitters of cascode transistors 406 and 407 to eliminate the bandwidth-limiting Miller capacitance of the input transistors 404 and 405. The output signal of the amplifier stage is between the two collectors of the cascode transistors 406 and 407, which are connected to the read amplifier power supply line via resistors 408 and 409.

The state-of-the-art output stage in FIG. 4a comprises two simple emitter followers stages consisting of output transistors 413 and 414 and current sources 411 and 412 each with a magnitude of I3. Tail currents $I_1$ and $I_3$ are the currents required to obtain full speed bandwidth.

Figure 4B:
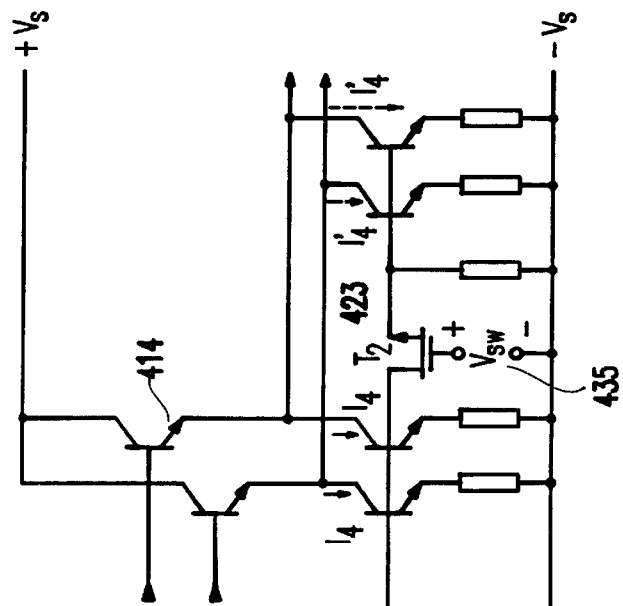
FIG. 4b is a schematic diagram of the implementation of a novel selectable biasing scheme for the input and output stage tail current of the readback amplifier in the read/write electronics module.

FIG. 4b is an embodiment of the inventive biasing which enables selecting a lower power mode setting for both the input and output stage. The operation is as follows.

In FIG. 4b the tail current for the input stage (tail current 410 in FIG. 4a) is split into two current sources: one of transistor 427, resistor 428 and reference voltage 430 which provides a tail current I2 for the input stage in the battery mode, and a selectable current source with magnitude I'2 of transistor 425, resistor 426 and a MOSFET switch between the base of transistor 425 and the reference voltage 430. The MOSFET switch is turned on when the computer is in external power supply mode. This increases the tail current trough the input stage with a current I'2, resulting in a total tail current I2+I'2 which should be chosen equal to I1 to obtain the same bandwidth for the input stage as the state-of-the-art input stage of FIG. 4a. The current sources in the output stage (411 and 412 in FIG. 4a) are in FIG. 4b split in the same way as the tail current in the input stage. A MOSFET switch 423 is used to switch between the two power supply modes. Again, the sum of the currents of the split current sources should be equal to the corresponding current source in FIG. 4a: I4+I'4=I3.

FIG. 4c shows an alternative way to achieve a selectable current for a current source. Instead of summing two current sources as in FIG. 4b, here the magnitude of the current of the current source itself is changed by switching with MOSFET switch 434 a resistor 433 in parallel with resistor 432 in the high performance mode increasing the current I4 with a current I'4.

Figure 5:
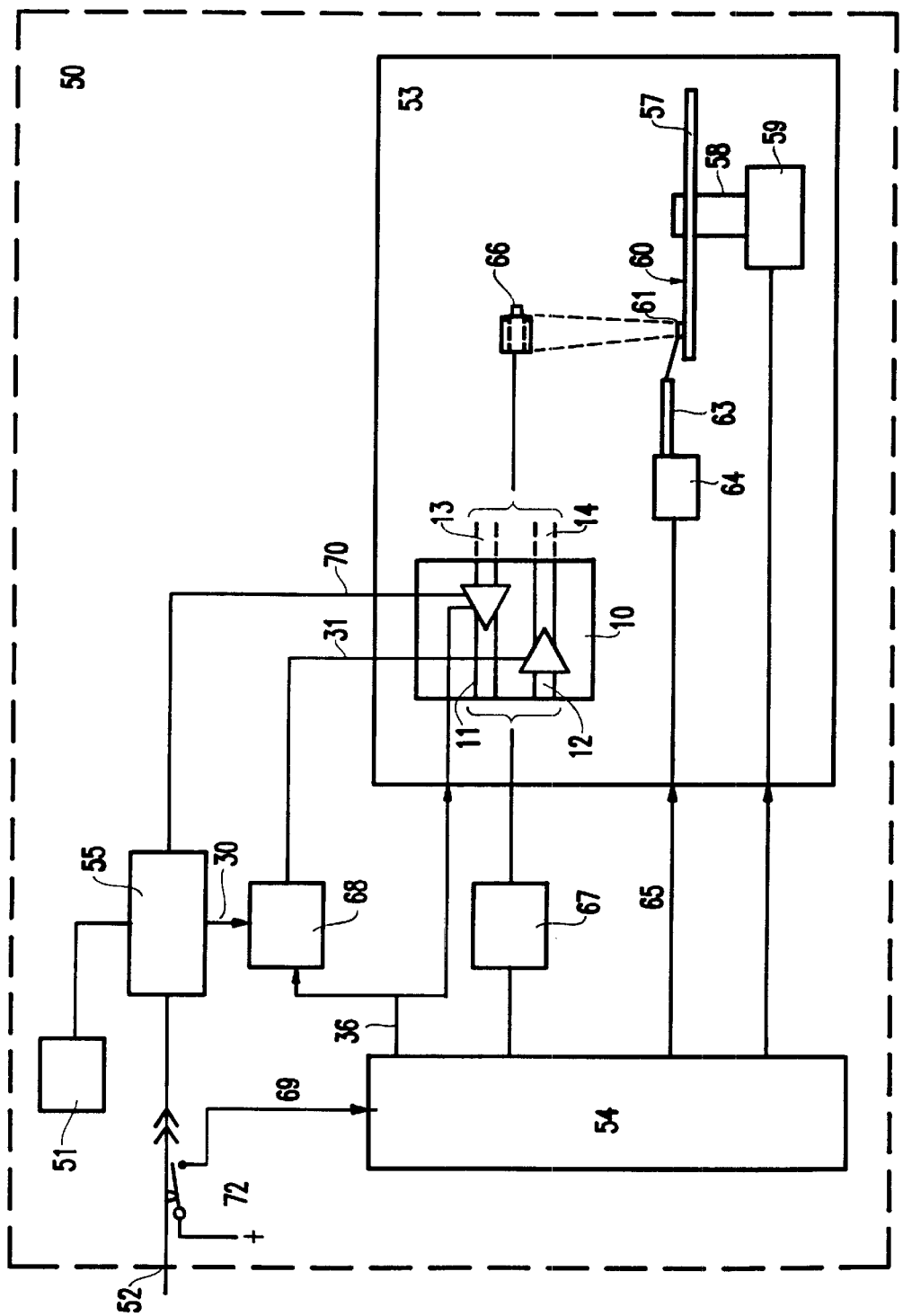
FIG. 5 is a schematic drawing of a portable computing device, showing only the components that are pertinent to the invention.

FIG. 5 is a schematic drawing of a portable computing device 50, such as a laptop computer, that illustrates the interrelationships of the features of the invention discussed above. The laptop computer 50 includes, apart from components not pertinent to this invention, a battery 51, a connection to an external power source of 52, a controller 54, a regulated power supply 55, a switching power supply 68, a data channel chip 67, and a hard disk drive 53. A known detection mechanism 72, such as a mechanical switch which is activated by the body of the external power plug when it is inserted into the power inlet 52 of the portable computer 50, indicates to the controller 54 whether the external power source 52 or the internal battery 51 is supplying power. As discussed above, based on this information, the controller 54 will put the computer 50 in low-performance mode when the battery is being used, or in high-performance mode when the external power line is being used.

The disk drive 53 reads from and writes to at least one disk 57, which is supported on a spindle 58 and rotated by a disk drive motor 59 of which the rotation speed is controlled by controller 54. The disk 57 includes recording media on a surface 60 of the disk, which may be written or read from using the disk drive 53.

The disk drive 53 also includes slider 61 that is shown positioned in proximity to the disk 57. The slider 61 supports a magnetic read and write head. The slider 61 is coupled to a suspension 62 that supports slider 61.

The suspension 62 is coupled to an arm 63 which supports the suspension 62 and moves the suspension 62 and head across the surface 60 of the disk 57. The arm 63 is coupled with an actuator, depicted as a voice coil motor (VCM) 64 in FIG. 5. Based on a position control signal supplied from the controller 54 via the line 65, the VCM 64 moves the actuator arm 63. This allows the actuator arm 63 to move the suspension 62 and, therefore, the slider 61 across the surface 60 of the disk 57.

Also depicted in FIG. 5 is the head 66, attached to the slider 61. Components (not shown in FIG. 5) on the head 66 read from and write to the recording media on the surface 60 of the disk 57. In addition to providing the position control signal, the control unit controls other operations of the disk drive 53.

For example, read and write signals are provided to and from the head 66 via the data recording channel chip 67 and the read/write electronics module 10. The read/write electronics module 10 includes a readback amplifier whose input 13 is connected to the (G)MR read element on head 66 for reading signals from the recording media on the surface 60 of the disk 57. The readback amplifier is provided with a fixed power supply voltage 70. An I/O line 36 coming from the controller 54 selects the high or low performance mode for the read amplifier.

Module 10 also includes a write driver whose output is connected to the inductive write element on head 66 for writing signals to said surface 60 of disk 57. The write driver is provided with a power supply voltage 31 coming from a switching power supply 68 with a selectable output voltage: a nominal voltage for the high performance mode and lower voltage for the low performance mode. The selection is controlled by line 36 coming from the controller 54. The controller 54 selects the low performance mode settings which lowers the clock rate for the data channel, lowers the tail currents in the amplifier stages of the readback amplifier in the read/write module, lowers the power supply for the write driver in the read/write electronics module, and lowers the rotational speed of the disk when switch 72 indicates to the controller 54 via line 69 that the power is supplied by the battery. When the external power line 52 is used, the controller 54 will select the high performance mode.

While a two-speed hard disk is discussed above, as would be known by one ordinarily skilled in the art given this disclosure, the invention is equally applicable to a variable speed hard drive disk. Further, while the invention has been described above with respect to a hard disk, the invention is equally applicable to any rotational storage devices, such as external floppy disks, read/write compact disks, etc.

An important feature of the invention is that additional power is saved by reducing the power consumption of the read/write electronics. The reduction in rotational speed comes with an equal reduction in data rate. Thus, with the invention, the bandwidth of the readback amplifier in the read/write electronics module can be reduced by the same factor. This allows the tail currents to be reduced by this same reduction factor in all the amplifier stages of the read amplifier. The power consumption by these stages is correspondingly reduced by this same factor. For the write driver, the required rise and fall times of the write current for the inductive write head can be increased by this factor, which results in a required power supply voltage for the write driver which is lower by this same factor.

The power consumption of the write driver output stage (which is the dominant power dissipator in the write driver) is the product of the power supply current (which is the same for high and low performance mode) and the power supply voltage (which is reduced by the same factor). The power consumption of the write driver in the read/write electronics module is for that reason also reduced by this factor in the low performance mode.

Also, while the invention has been described in terms of preferred embodiments, those skilled in the art will recognize that the invention can be practiced with modification within the spirit and scope of the appended claims.

What is claimed is:

1. A portable computer comprising:
    a battery and a connection to an external power source;
    a two-speed data storage device being supplied power from one or more of said battery and said external power source; and
    a controller attached to said storage device,
    wherein said controller reduces a speed and data transfer rate of said storage device, lowers a clock rate for a data channel, lowers tail currents in amplifier stages of a readback amplifier in a read/write module, lowers a power supply for a write driver in said read/write module, and lowers a rotational speed of a hard drive disk connected to said storage device when said storage device is powered by said battery and increases said speed and data transfer rate of said storage device, increases a clock rate for a data channel, increases tail currents in amplifier stages of a readback amplifier in a read/write module, increases a power supply for a write driver in said read/write module, and increases a rotational speed of a hard drive disk connected to said storage device when said storage device is powered by said external power source.

2. The portable computer in claim 1, wherein said storage device includes a read/write electronics module, comprising a write driver circuit connected to a write head writing to said magnetic disk, wherein said write driver circuit includes a power supply having an output voltage supplied to said write head, said output voltage being reduced when said storage device is powered by said battery and said output voltage being increased when said storage device is powered by said external power supply.

3. The portable computer in claim 2, wherein said power supply connected to said write driver circuit has multiple resistive elements, wherein said resistive elements determine said output voltage of said power supply, and
    wherein said output voltage is reduced by disconnecting at least one of said resistive elements from said power supply and said output voltage is increased by connecting at least one of said resistive elements to said power supply.

4. The portable computer in claim 2, wherein a rise and fall time of a write current of said write head is increased by reducing said output voltage supplied to said write driver circuit and said rise and fall time of said write current is decreased by increasing said output voltage supplied to said write driver circuit.

5. The portable computer in claim 4, wherein said rise and fall time of said write current is changed inversely proportional to said rotational speed of said magnetic disk.

6. The portable computer in claim 1, wherein said storage device includes a read/write electronics module comprising a read amplifier connected to a (G)MR read head, reading magnetic transitions from said magnetic disk, wherein said read amplifier comprises multiple cascaded amplifier stages.

7. The portable computer according to claim 6, wherein said tail currents are changed proportional to said rotational speed of said magnetic disk.

8. A portable electronic device comprising:
   a battery and a connection to an external power source; and
   a multi-speed data storage device being supplied power from one or more of said battery and said external power source;
   wherein a data transfer rate of said storage device is reduced, a clock rate for a data channel is lowered tail currents in amplifier stages of a readback amplifier in a read/write module are lowered, a power supply for a write driver in said read/write module is lowered, and a rotational speed of a hard drive disk connected to said storage device is lowered when said storage device is powered by said battery and said data transfer rate of said storage device is increased, a clock rate for a data channel is increased, tail currents in amplifier stages of a readback amplifier in read/write module are increased, a power supply for a write driver in said read/write module is increased, and a rotational speed of a hard drive disk connected to said storage device is increased when said storage device is powered by said external power source.

9. The electronic device in claim 8, wherein said storage device includes a read/write electronics module, comprising a write driver circuit connected to a write head writing to said magnetic disk, wherein said write driver circuit includes a power supply having an output voltage supplied to said write head, said output voltage being reduced when said storage device is powered by said battery and said output voltage being increased when said storage device is powered by said external power supply.

10. The electronic device in claim 9, wherein said power supply connected to said write driver circuit has multiple resistive elements, wherein said resistive elements determine said output voltage of said power supply, and
   wherein said output voltage is reduced by disconnecting at least one of said resistive elements from said power supply and said output voltage is increased by connecting at least one of said resistive elements to said power supply.

11. The electronic device in claim 9, wherein a rise and fall time of a write current of said write head is increased by reducing said output voltage supplied to said write driver circuit and said rise and fall time of said write current is decreased by increasing said output voltage supplied to said write driver circuit.

12. The electronic device in claim 11, wherein said rise and fall time of said write current is changed inversely proportional to said rotational speed of said magnetic disk.

13. The electronic device in claim 8, wherein said storage device includes a read/write electronics module comprising a read amplifier connected to a (G)MR read head, reading magnetic transitions from said magnetic disk, wherein said read amplifier comprises multiple cascaded amplifier stages.

14. The electronic device according to claim 8, wherein said tail currents are changed proportional to said rotational speed of said magnetic disk.

15. A method of conserving power in a portable electronic device comprising:
   determining whether said electronic device is being supplied power from an internal battery or an external power source;
   reducing a data transfer rate of a storage device, lowering a clock rate for a data channel, lowering tail currents in amplifier stages of a readback amplifier in a read/write module, lowering a power supply for a write driver in said read/write module, and lowering a rotational speed of a hard drive disk connected to said storage device when said electronic device is powered by said battery; and
   increasing said data transfer rate of said storage device, increasing a clock rate for a data channel, increasing tail currents in amplifier stages of a readback amplifier in a read/write module, increasing a power supply for a write driver in said read/write module, and increasing a rotational speed of a hard drive disk connected to said storage device when said storage device is powered by said external power source.

16. The method in claim 15, wherein said storage device includes a read/write electronics module, comprising a write driver circuit connected to a write head writing to said magnetic disk, wherein said write driver circuit includes a power supply having an output voltage supplied to said write head, said output voltage being reduced when said storage device is powered by said battery and said output voltage being increased when said storage device is powered by said external power supply.

17. The method claim 16, wherein said power supply includes multiple resistive elements, said write driver circuit has multiple resistive elements, wherein said resistive elements determine said output voltage of said power supply, and
   wherein said reducing includes reducing said voltage supplied to said storage device by disconnecting at least one of said resisted elements from said power supply, and
   said increasing includes increasing said voltage supplied to said storage device by connecting at least one of said resisted elements to said power supply.

18. The method in claim 16, further comprising increasing a write current of said write head by reducing said output voltage supplied to said write driver circuit;
   and decreasing said rise and fall time of said write current by increasing said output voltage supplied to said write driver circuit.

19. The method in claim 18, further comprising changing said rise and fall time of said write current is changed inversely proportional to said rotational speed of said magnetic disk.

20. The method in claim 18, wherein said storage device includes a read/write electronics module comprising a read amplifier connected to a (G)MR read head, reading magnetic transitions from said magnetic disk, wherein said read amplifier comprises multiple cascaded amplifier stages.

21. The method in claim 15, wherein said tail currents are proportionally changed to said rotation speed of said magnetic disk.

* * * * *